(12) United States Patent
Kozlov

(10) Patent No.: US 12,179,160 B2
(45) Date of Patent: Dec. 31, 2024

(54) METHOD AND DEVICE FOR SATURATING A PRODUCT WITH CARBON DIOXIDE

(71) Applicant: Aleksandr Gennadevich Kozlov, g. Kursk (RU)

(72) Inventor: Aleksandr Gennadevich Kozlov, g. Kursk (RU)

( * ) Notice: Subject to any disclaimer, the term of this patent is extended or adjusted under 35 U.S.C. 154(b) by 246 days.

(21) Appl. No.: 17/633,510

(22) PCT Filed: Aug. 14, 2019

(86) PCT No.: PCT/RU2019/000573
§ 371 (c)(1),
(2) Date: Feb. 7, 2022

(87) PCT Pub. No.: WO2021/029780
PCT Pub. Date: Feb. 18, 2021

(65) Prior Publication Data
US 2022/0297071 A1   Sep. 22, 2022

(51) Int. Cl.
| | | |
|---|---|---|
| *B01F 23/23* | (2022.01) | |
| *A23L 2/54* | (2006.01) | |
| *B01F 23/231* | (2022.01) | |
| *B01F 23/234* | (2022.01) | |
| *B01F 23/236* | (2022.01) | |
| *B01F 23/237* | (2022.01) | |
| *B01F 101/14* | (2022.01) | |

(52) U.S. Cl.
CPC ......... *B01F 23/2363* (2022.01); *A23L 2/54* (2013.01); *B01F 23/23* (2022.01); *B01F 23/2312* (2022.01); *B01F 23/23413* (2022.01); *B01F 23/236* (2022.01); *B01F 23/237621* (2022.01); *B01F 2101/14* (2022.01); *B01F 2215/0422* (2013.01); *B01F 2215/0431* (2013.01)

(58) Field of Classification Search
CPC ..... B01F 23/23; B01F 23/2312; B01F 23/236
See application file for complete search history.

(56) References Cited

U.S. PATENT DOCUMENTS 11,254,028 B2 *   2/2022  Jamal ................... B28B 11/24
2011/0091623 A1   4/2011  Clüsserath

FOREIGN PATENT DOCUMENTS

JP    H02212311 A  *  8/1990
RU    2 008 773       3/1994
(Continued)

OTHER PUBLICATIONS

International Search Report for PCT/RU2019/000573 dated May 25, 2020, 6 pages.
(Continued)

*Primary Examiner* — Robert A Hopkins
(74) *Attorney, Agent, or Firm* — Nixon & Vanderhye PC

(57) ABSTRACT

The invention relates to the food industry. A method of saturating a beverage with CO2 comprises supplying the liquid and the gas under pressure, increasing the mass transfer surface, intensively mixing the components in a chamber, and subsequently feeding them into a storage tank. The mass transfer surface is increased abruptly prior to mixing by converting the liquid to a moist saturated vapor state, and the vapor-gas mixture is condensed before feeding into the storage tank. Also described is a device for saturating a beverage with CO2, which device is in the form of a water-air ejector.

3 Claims, 1 Drawing Sheet

(56) References Cited

FOREIGN PATENT DOCUMENTS

| | | |
|---|---|---|
| RU | 2 209 350 | 7/2003 |
| UA | 30296 | 11/2000 |
| UA | 20 314 | 1/2007 |

OTHER PUBLICATIONS

Written Opinion of the ISA for PCT/RU2019/000573 dated May 25, 2020, 6 pages.

* cited by examiner

METHOD AND DEVICE FOR SATURATING A PRODUCT WITH CARBON DIOXIDE

This application is the U.S. National Phase of International Application No. PCT/RU2019/000573 filed Aug. 14, 2019, the entire content of which is hereby incorporated by reference.

FIELD OF THE INVENTION

The invention relates to the food industry, namely, to the methods and devices for product saturation with $CO_2$ and can be used in the beer and non-alcoholic beverage industry.

BACKGROUND

High demands are imposed on the products $CO_2$ saturation methods, since it is necessary to saturate significant flow volumes of products with $CO_2$ in a short period of time, specifically, up to 25 liters of product per second or 1.5 m$^3$ of product per minute.

In all the known methods and devices for the product $CO_2$ saturation, the gaseous phase is mixed with the liquid phase of the product. The main way of increasing the efficiency of the product $CO_2$ saturation is to increase the mass transfer surface area when mixing the product with $CO_2$. At the current level of technology, an increase in the mass transfer surface area is achieved by mechanical crushing of the product flow, before mixing it with $CO_2$, into the smallest droplet volumes possible, or by breaking the product flow with various devices and supplying $CO_2$ under pressure into a certain volume.

The prior art discloses a method and device for a liquid medium carbonization (see [1] US20110091623A1, IPC A23L 2/54; B01F 3/04; B01F 5/04, publ. Apr. 21, 2011), including the introduction of $CO_2$ under pressure into a liquid medium using at least one nozzle device provided in the housing through which the liquid medium passes, wherein the said nozzle device is selected from the group consisting of: a nozzle device having a plurality of nozzle or outlet openings, wherein the said nozzle or outlet openings are configured as distributed along at least one processing channel passing through the liquid medium; and a nozzle device having at least one slit-type nozzle that extends along at least one processing channel.

The disadvantage of this solution is a low phase interaction time. Since the phase interaction time does not exceed a few seconds, only the boundary droplets layer closest to the product phases/$CO_2$ interface has enough time to get saturated up to the limiting equilibrium $CO_2$ concentration within the product. In the process, the concentration of gas in a liquid droplet decreases with the distance from the droplet surface to the droplet center. As a result, the gas concentration in the product in the known saturation methods is significantly lower than the physically possible limiting equilibrium concentration at the equal saturation process constitutive parameters: the pressure and the temperature. The known saturation methods are characterized by a relatively low $CO_2$ dissolution quality in the product, since the potential of the $CO_2$ dissolution in the product is not realized to the full extent; that is, to obtain the required $CO_2$ concentration, non-optimal parameters of the saturation process are required: a higher saturation pressure and a lower saturation temperature, in comparison to the process where the product $CO_2$ saturation occurs while reaching the limiting equilibrium concentration of $CO_2$ in the product.

A classic device for the water gas saturation is known, the same device comprising an air-and-water ejector activating a pressure chamber for supplying a product, a nozzle, a receiving chamber with a gas supply channel, a mixing chamber and a diffuser (see [2] Sokolov E. Ya., N. M. Singer. Jet devices, Moscow, Energy, 1970, pp. 213-215). In this device, the mixing chamber length exceeds its inner diameter by the factor of 8-10. During the device operation, the working liquid flow is broken by the flow of gas. The device is intended for the implementation of the known method characterized by the above-described disadvantages of the product $CO_2$ saturation process.

The modern patents in the field of the methods and devices intended for the gas dissolution in liquids are not notable for a significant scientific novelty. Thus, in a patent of the People's Republic of China (see [3] CN201001378, IPC A23L 2/54, publ. Jan. 9, 2008), the Venturi tubes are connected in series. A sudden volume expansion creates negative pressure to absorb $CO_2$ into water or syrup, and then the gauge contracts and the pressure within the tube increases, thereby increasing the $CO_2$ dissolution degree. This method has more disadvantages than advantages, since it does not allow either the first or the second Venturi tube to reach its full technological potential.

The prior art discloses a method for introducing gas into water for the components binding, a device for the method implementation and the water obtained using this method (see [4] EP0314015A1, IPC A01G 7/00; B01F 1/00, publ. May 3, 1989). A method for introducing a gas such as oxygen, air or carbon dioxide into water, in which a stream of gas-enriched water is passed through a reaction chamber so that the stream rotates around and moves along a longitudinal axis, wherein a sudden pressure minimum is provided by the portion of this axis where the gas contained in the stream is collected and mixed with the steam and the pressure increases after reaching the minimum value, as a result of which the gas is absorbed by the water, so that the gas molecules bind to the water molecules. The device for this method implementation comprises a closed recirculation channel with a reaction chamber; the flow is maintained by a pump; and the gas is introduced into the water either by a vortex flow or by a water-jet pump. The water thus obtained contains gas in a stable and bound state in a concentration exceeding the normal saturation value. The dielectric conductivity and some physical parameters of such water differ from those of the pure water. This method is based on avoiding flow turbulences. It is important to note that the device described in the patent uses a recirculation loop, that is, the gassed product is returned back to the container, which is not only unfeasible for the industrial application, but also suggests that one phase of the drink saturation with the carbonic acid is not enough.

Also, the prior art discloses a method and device for water carbonization without a buffer tank (see [5] U.S. Pat. No. 5,842,600, IPC A23L 2/54; B01F 3/04, publ. Dec. 1, 1998) involving the combining of the respective water and carbon dioxide flows in the mixing Venturi tube. Typically, either a static mixer or a Venturi tube are used for saturation. The statement concerning the carbonization enactment without a buffer tank is a formality, since all the modern technologies utilize carbon dioxide/product mixing without a buffer tank. A pressurized buffer tank is needed to keep the gas within the carbonated drink, since both in reality and technically the product carbonization takes place without a buffer tank.

It is important to note that despite the pressure of 100-120 psi (6.89-8.27 bar) being sufficient to implement the Venturi saturation method, our method requires a pressure of at least 150 psi (10.34 bar) and, optimally, 180 psi (12.41 bar) at the components mixing stage, after the flow turbulization. Due to the much greater efficiency of our method and device (whose geometry is also optimized for the method implementation), much greater amount of gas is dissolved; that is, the dissolution efficiency is higher. To «suck in» the maximum volume of gas that can be dissolved in the flow (which, in turn, is cavitated), a much greater, abrupt single-step pressure drop is required, and not a laminar pressure drop as is the case when utilizing the Venturi method. It is important to note that during the Venturi method utilization not only the flow is laminar, but the pressure drop is also not abrupt, but much smoother.

SUMMARY OF THE INVENTION

The group of inventions is aimed at solving the following engineering problems: 30-50% pressure increase relative the pressure level used in Venturi systems, at saturation unit input; abrupt increase of the mass transfer surface area by changing the product phase state before mixing it with $CO_2$ up to the limiting equilibrium $CO_2$ concentration within the product at the saturation process constitutive parameters: the pressure and the temperature; introduction of structural changes in the known product gas saturation device, specifically, changes in the receiving chamber dimensions, changes in the ratios between the mixing chamber transverse and longitudinal dimensions, to provide for the performing of the aforementioned task, namely, the obtainment of the limiting equilibrium concentration of $CO_2$.

The technical result of the invention consists in the increasing of the mass transfer surface area, reducing the product foaming while bottling and, as a consequence, reducing the $CO_2$ consumption, prolonging the time of the $CO_2$ retention in the product during the shelf life, reducing the need for an increased pressure in the buffer columns and for the product cooling before saturation.

The engineering problem is solved and the technical result is achieved by using the method of product saturation with carbon dioxide ($CO_2$) comprising the following steps: supplying the liquid flow from the pressure chamber at the pressure of (P1) and flow velocity of (V1) to the nozzle where the liquid is accelerated to a high flow velocity (V2) after which the liquid flow is released from the nozzle at ultra-low pressure (P2); the liquid flow is supplied into the receiving chamber simultaneously with $CO_2$ coming through the channels, and an underpressure is created at the receiving chamber input, i.e., an abrupt single-step pressure drop (P3), due to which the liquid before the saturation is transformed into a wet saturated steam to increase the surface area of the mass transfer between the wet saturated steam and $CO_2$ by a factor of 10,000-12,000 in comparison to the surface area of the mass transfer between liquid droplets and $CO_2$; the wet saturated steam and $CO_2$ are supplied into the mixing chamber and the wet saturated steam is intensively mixed with $CO_2$ while obtaining a steam-gas mixture; the obtained steam-gas mixture is supplied to the condensation chamber and the steam-gas mixture is condensed within the flow while obtaining a carbonated product; the condensed carbonated product is supplied to a storage container where $CO_2$ is being completely dissolved at the given saturation process constitutive parameters: the pressure and the temperature, with the dissolution efficiency of 100%.

The engineering problem is solved and the technical result is achieved by using the device for the product saturation with carbon dioxide ($CO_2$) made in the form of an air-and-water ejector type device comprising the following serially arranged components: a pressure product supply chamber, a nozzle, a receiving chamber with four gas supply channels, a mixing chamber, a condensation chamber and a diffuser; wherein the receiving chamber length is 0.5-0.8 times the nozzle diameter, the mixing chamber diameter is 1.07-1.2 times the nozzle diameter and the mixing chamber length is 6 times greater than its internal diameter; wherein the device is equipped with the condensation chamber arranged between the mixing chamber and the diffuser.

The technical result is also achieved due to the fact that the four gas supply channels are arranged in the receiving chamber walls and are located perpendicular to the device axis being spaced 90 degrees relative one another: 90, 180, 270, 360 degrees.

EMBODIMENT OF THE INVENTION

It is important to note that, in contrast to the Venturi method described in the analogous solutions, the claimed method is aimed at turbulization and cavitation of the flow and at the molecular bond breaking with an abrupt single-step and maximum decrease in pressure. The claimed group of inventions maximizes the flow turbulization to increase the cavitation and rupture of molecular bonds which are characterized by high energy capacity. To be capable of rupturing the bonds and obtaining the molecular level mixing, the claimed method requires a high degree of turbulence. Only then the maximally turbulized flow (not the maximally laminar one as in Venturi method; please, note the Venturi geometry which is characterized by smooth lines) enters a mixing chamber at high speed, where it is necessary to provide for an abrupt, single-step and maximum pressure reduction (with the Venturi method, not only the flow is laminar, but the pressure does not drop abruptly, but in a laminar fashion—a trait characteristic of the Venturi geometry). The ($CO_2$) gas is supplied into the turbulized cavitated flow from 4 gas supply channels.

Figure 1:
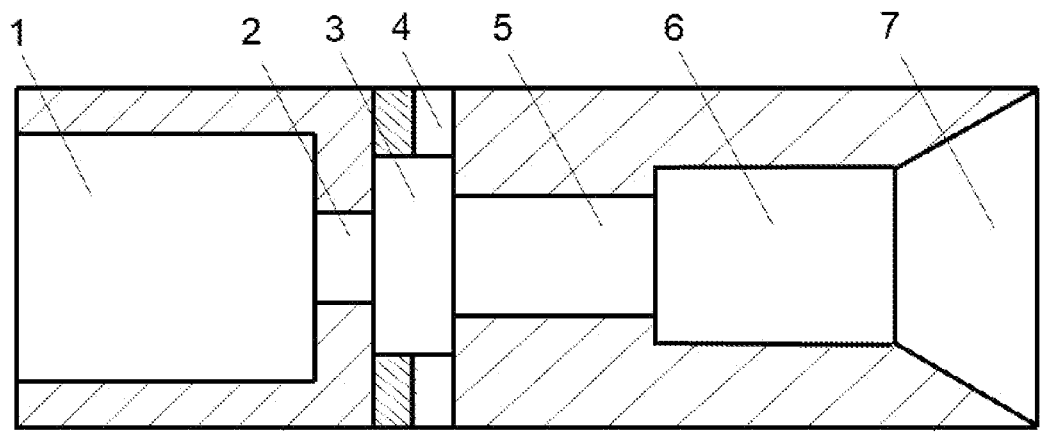
FIG. 1—Schematic diagram of the device for the product carbon dioxide saturation.

The essence of the invention is illustrated by the diagram (FIG. 1) which shows the proposed device for the food products (drinks) saturation with carbon dioxide ($CO_2$) within a flow. The device is made in the form of an air-and-water ejector type device comprising the following serially arranged components: a pressure chamber for supplying a product (1), a nozzle (2), a receiving chamber (3) with four gas supply channels (4), a mixing chamber (5), a condensation chamber (6) and a diffuser (7). The length of the receiving chamber (3) is 0.5-0.8 times the nozzle (2) diameter. The gas supply channels (4) are arranged within the receiving chamber (3) walls and are located perpendicular to the axis of the device with an interval of 90 degrees relative one another: 90, 180, 270, 360 degrees; they are also made milled and have a length that is several times longer than the length of the gas supply channels of any variants/inventions based on Venturi tubes. The diameter of the mixing chamber is 1.0-1.2 times the diameter of the nozzle, and the mixing chamber length is six times greater than its inner diameter.

The claimed device is implemented through the claimed method. The liquid with the pressure P1 and velocity V1 is supplied by a high-pressure pump to the pressure chamber (1) and passes through the nozzle (2) into the receiving chamber (3). In the nozzle (2), the liquid is accelerated to a high flow velocity V2>V1, as a result of which it leaves the nozzle (2) at an ultra-low pressure P2<P1. From the nozzle (2), the liquid flow enters the receiving chamber (3) simultaneously with the $CO_2$ supplied through the channels (4). The length of the receiving chamber (3) provides for the creation of an underpressure inside, i.e., the abrupt single-step pressure drop (P3) necessary and sufficient for the formation of a powerful turbulent flow and for «boiling up» of the product flow, that is, the transition of the liquid into the wet saturated steam state. The wet saturated steam state is necessary to increase the mass transfer surface area between the wet saturated steam and $CO_2$ by the factor of 10,000-12,000 in comparison to the mass transfer surface area between the liquid droplets and $CO_2$. Due to the underpressure in the receiving chamber (3), the carbon dioxide entering through the channels (4) is captured by the moist saturated steam, and the «boiling» product flow together with the gas rushes into the mixing chamber (5) at a high velocity of up to 80 m/s and under high pressure. The dimensions of the mixing chamber and its length provide for the product vapor particles saturation with the gas up to the maximum equilibrium concentration. The saturated flow (the resulting steam-gas mixture) is directed to the condensation chamber (6) where, due to the increased geometric dimensions of the condensation chamber (6) in comparison to the mixing chamber (5) dimensions, the flow is decelerated and its velocity decreases, but the pressure increases, as a result of which the steam-gas mixture condenses within the flow while obtaining a carbonated product. From the condensation chamber (6), the gas-saturated product (condensed carbonated product) the concentration of which has reached the limiting or close to the limiting equilibrium concentration value for the given process constitutive parameters is directed through the diffuser (7) into the storage tank (not shown in the figure).

Figure 2:
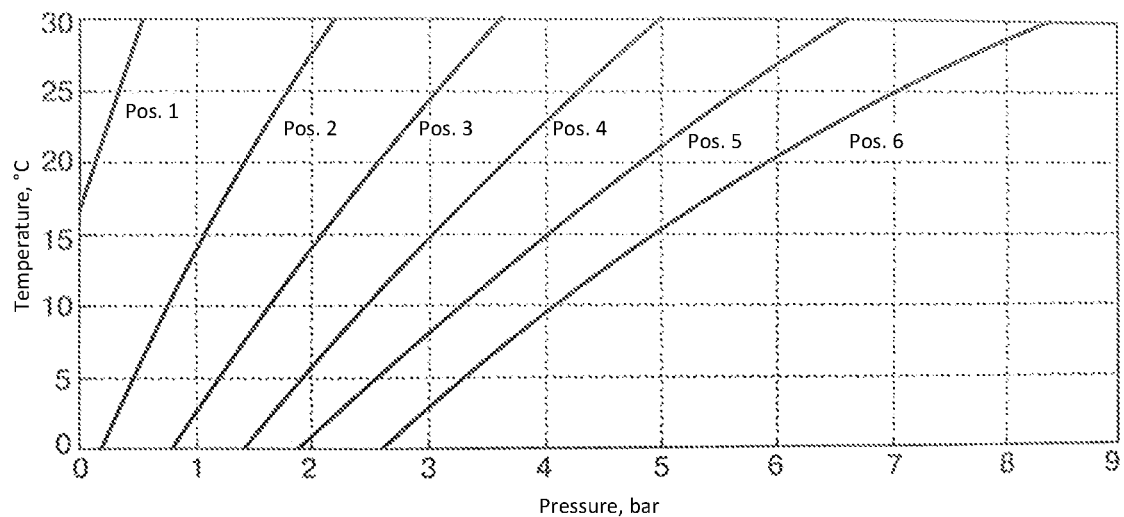
FIG. 2—Solubility table.
Numbers in the figure indicate the following positions:
1—pressure chamber for the product supply; 2—nozzle; 3—receiving chamber; 4—gas supply channels; 5—mixing chamber; 6—condensation chamber; 7—diffuser.

As a result, a product is obtained in which $CO_2$ is completely dissolved at the given process constitutive parameters: the pressure and the temperature, with the dissolution efficiency of 100%. In the process, the specified parameters are taken from the solubility table (FIG. 2), in order to reach the solubility limit; e.g., at the pressure of 4 bar and the temperature of +15° C., it is possible to dissolve 5 volume fractions of $CO_2$ in 1 liter of the product; i.e., if it was possible to dissolve 5 volume fractions, then no more will be possible since we have reached the limits of the possibility granted by the physical law.

EXAMPLE

The effectiveness of the proposed method and device was tested at operating bottling production lines for carbonated products of various configurations and manufacturers by replacing the saturation units on carbonators and mixer carbonators with the proposed device. According to the carbonated product manufacturers requirements, the saturation of the carbonated products with $CO_2$ should vary from 5 to 8.8 grams of $CO^2$ per liter, depending on the recipe. In the process, the higher the temperature of the product $CO_2$ saturation, the lower will the electric energy consumption be that is necessary for cooling the product before the saturation; and the lower the product $CO_2$ saturation pressure, the lower will the $CO_2$ consumption be while saturating the product with $CO_2$. The qualitative advantages of obtaining the limiting equilibrium concentration of $CO_2$ in the product are also known, the said advantages including the improved taste and increased stability of the carbonated product, as well as the preservation of the $CO_2$ saturation degree in a PET bottle during the product storage. During the device testing, the filling lines operating parameters remained the same as before the testing. The tests were carried out ceteris paribus, with varying the process constitutive parameters to assess the proposed device performance. Depending on the goals and objectives of the production enterprise, the required $CO_2$ concentrations have been obtained with the following process constitutive parameters:

an increase in the saturation temperature from +8° C. to +16-18° C. (a process constitutive parameter is changed, specifically, the product $CO_2$ saturation temperature) with the obtainment of the required $CO_2$ concentration in the product at the same $CO_2$ saturation pressure (4 bar) in the carbonator/mixer carbonator before and after the device testing;

a decrease in the saturation pressure from 4 to 2.8 bar (a process constitutive parameter is changed, specifically, the product $CO_2$ saturation pressure) with the obtainment of the required $CO_2$ concentration in the product at the same product temperature in the carbonator/mixer carbonator before and after the device introduction (+8° C.);

a decrease in the saturation pressure from 4 to 3.4 bar and an increase in the saturation temperature from +8° C. to +14-15° C. (the process constitutive parameters are changed, specifically, the product $CO_2$ saturation pressure and temperature) with the obtainment of the required $CO_2$ concentration in the product.

Thus, the proposed device makes it possible to saturate the products with $CO_2$ at optimal process parameters: a higher saturation temperature and/or a lower saturation pressure, and the proposed saturation method allows transferring the product into the wet saturated steam state before mixing it with $CO_2$ and to achieve the maximum equilibrium concentration of $CO_2$ in the product within the flow.

The change of the product phase state before mixing it with gas is achieved due to a local pressure drop down to the saturation pressure. After mixing the product with the gas, the product pressure increases during condensation up to the process pressure value. The transfer of the product to the wet saturated steam state provides for an abrupt increase in the product/$CO_2$ mass exchange surface area by a factor of 10,000-12,000, that is, the product $CO_2$ saturation takes place at the molecular level. There is enough time for the $CO_2$ concentration in the product to reach the limit value which is maintained after the condensation.

The proposed ratio between the receiving chamber width and the nozzle diameter makes it possible to create the necessary vacuum, due to which the product passes into a suspended saturated steam state, and the $CO_2$ enters the mixing chamber together with the product. The ratio between the transverse dimension of the mixing chamber and its length provides for the maximum equilibrium concentration of $CO_2$ in the product. The condensation chamber dimensions ensure the condensation of the steam-gas mixture within the flow.

Only a single-step abrupt pressure drop created by the high flow velocity and by a certain flow path geometry, as well as the 4 milled gas supply channels designed to supply the optimal gas volume with an optimal velocity (the optimal volume and gas supply velocity values are the values at which the maximum underpressure value in the mixing chamber is achieved) to the mixing chamber allow cavitating and transferring the product into the wet saturated steam state, i.e., provide for a so-called "boiling" of the product in such a way that the area of the interfacing surface of the two product component phases will be equal and the gas will intensively intermix with the product, which, in turn, allows obtaining the above mentioned technical result, namely, saturating the product with $CO_2$ at higher temperature and at lower pressure without product foaming at the bottle-filling machines, and also preserving the gas within the PET containers for longer periods of time.

The invention claimed is:

1. A method for product saturation with carbon dioxide ($CO_2$), the method comprising:
   supplying the liquid flow from a pressure chamber at the pressure of (P1) and flow velocity of (V1) to a nozzle where the liquid is accelerated to a high flow velocity (V2) after which the liquid flow is released from the nozzle at ultra-low pressure (P2);
   the liquid flow is supplied from the nozzle to a receiving chamber simultaneously with $CO_2$ that is supplied through four channels, and an underpressure is created at the receiving chamber input, wherein the receiving chamber length 0.5-0.8 times the nozzle diameter;
   wet saturated steam and $CO_2$ are supplied to a mixing chamber and the wet saturated steam is intermixed with $CO_2$ while obtaining a steam-gas mixture, wherein the mixing chamber diameter is 1.07-1.2 times the nozzle diameter and the mixing chamber length is 6 times greater than its internal diameter;
   the obtained steam-gas mixture is supplied to a condensation chamber, arranged between the mixing chamber and a diffuser, and the steam-gas mixture is condensed while obtaining a carbonated product; and
   the condensed carbonated product is supplied to a storage tank.

2. A device for product saturation with carbon dioxide ($CO_2$) made in the form of an air-and-water ejector type device comprising the following serially arranged components: a pressure product supply chamber, a nozzle, a receiving chamber with four gas supply channels, a mixing chamber, a condensation chamber and a diffuser, wherein the receiving chamber length is 0.5-0.8 times the nozzle diameter, the mixing chamber diameter is 1.07-1.2 times the nozzle diameter and the mixing chamber length is 6 times greater than its internal diameter; wherein the device is equipped with the condensation chamber arranged between the mixing chamber and the diffuser.

3. The device according to claim 2, wherein the four gas supply channels are arranged in the receiving chamber walls and are located perpendicular to the device axis being spaced 90 degrees relative one another: 90, 180, 270, 360 degrees.

* * * * *